Nov. 12, 1946. C. W. BUCKLEY 2,411,080
RANGE SETTING MECHANISM
Filed June 15, 1943 3 Sheets-Sheet 1
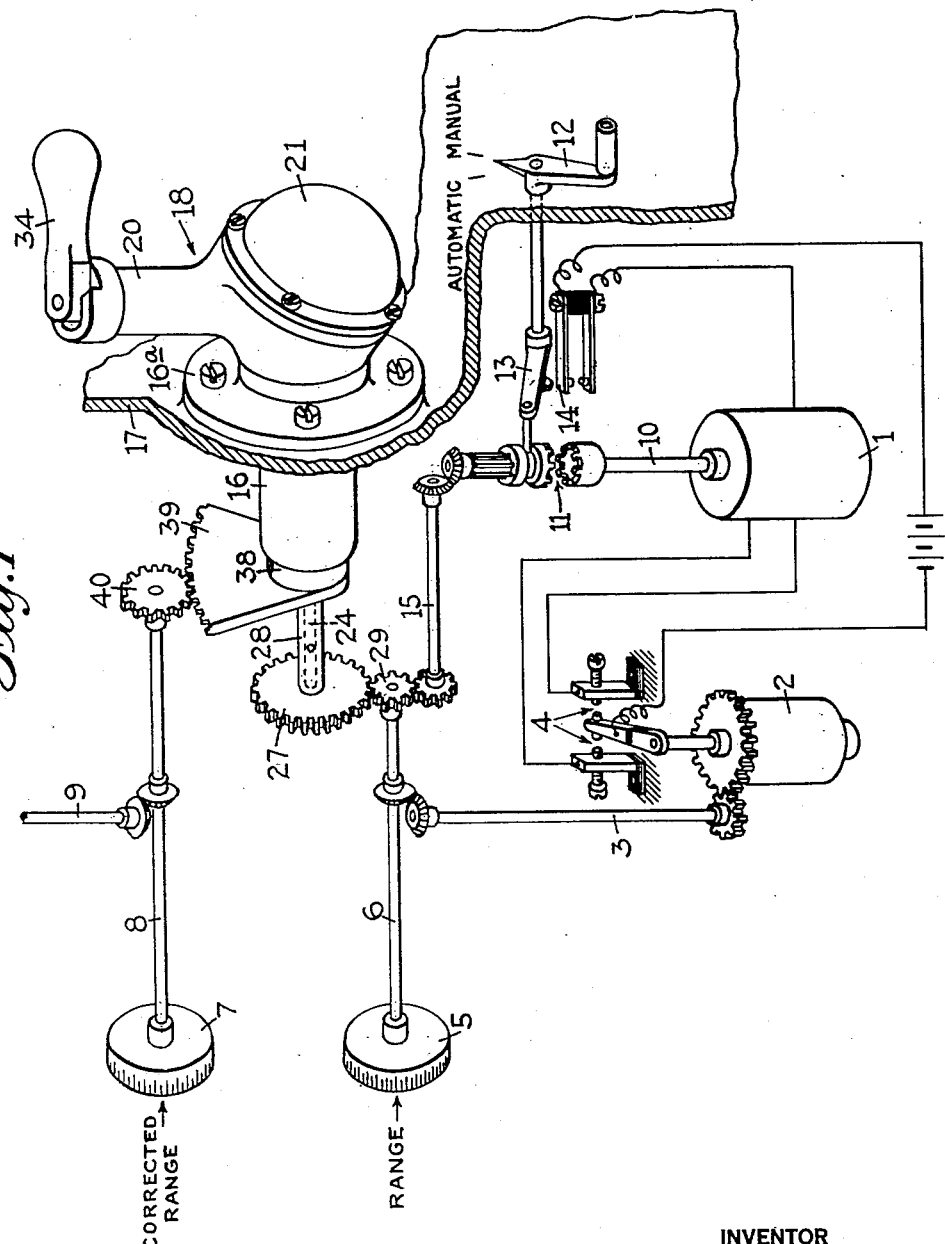
INVENTOR
CHARLES W. BUCKLEY
BY
ATTORNEY

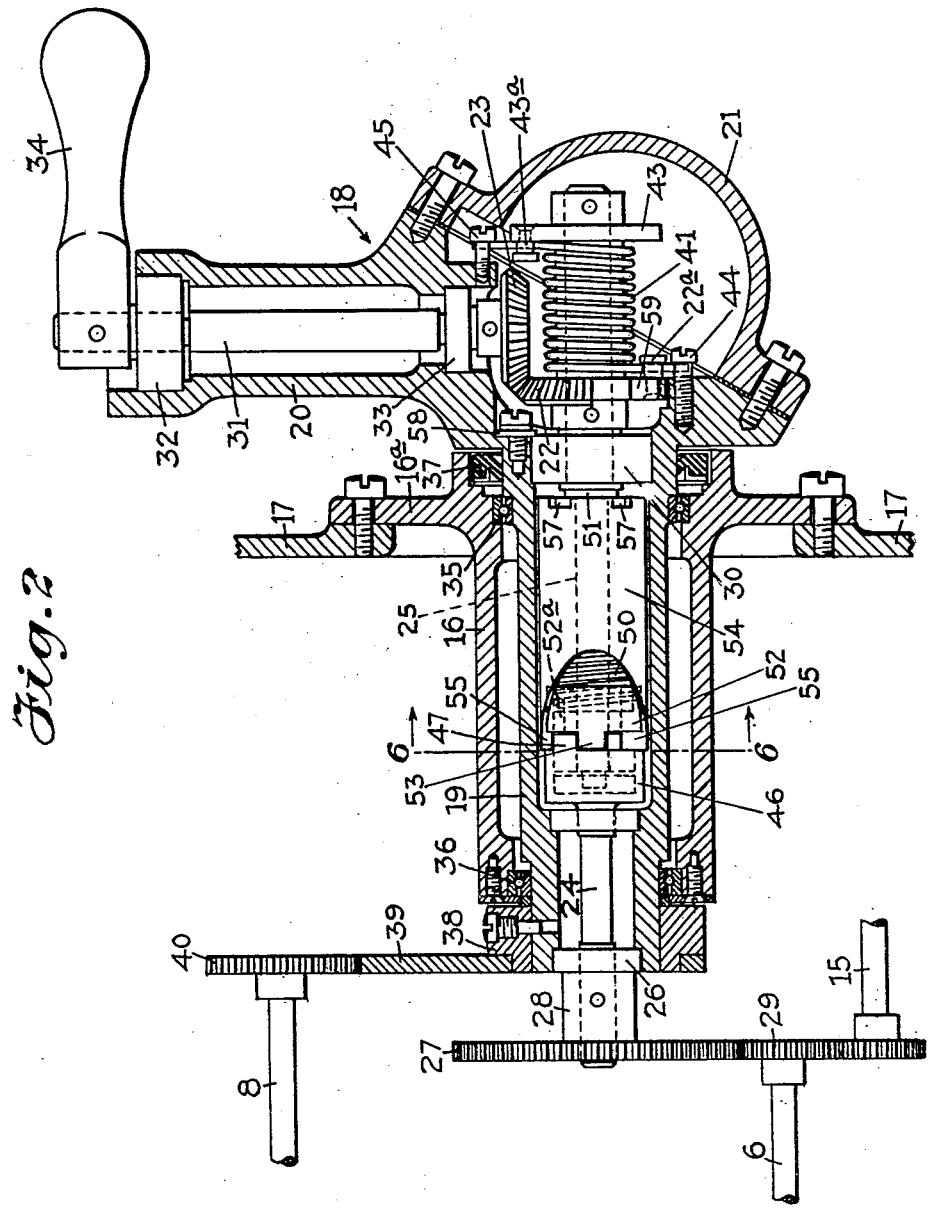

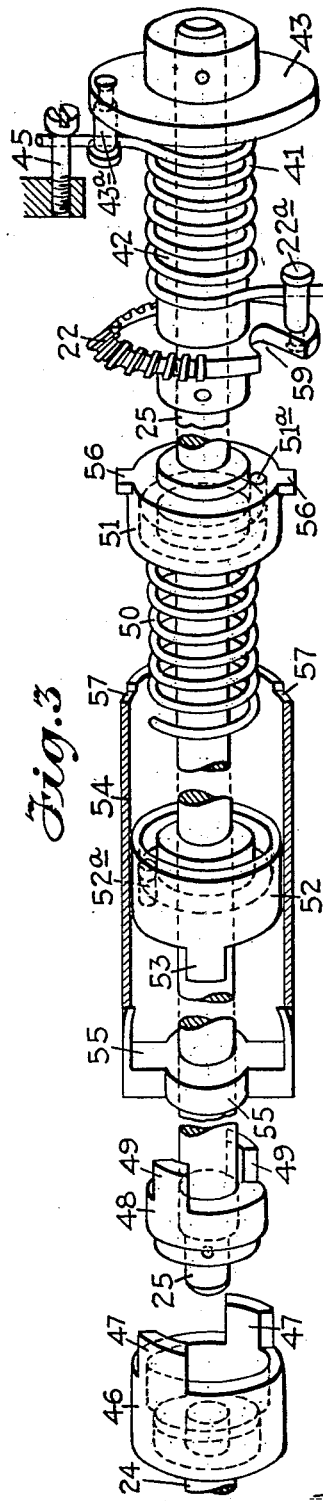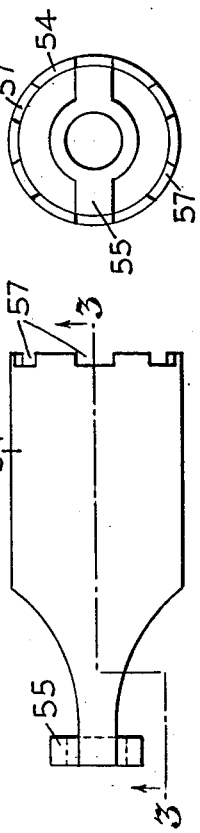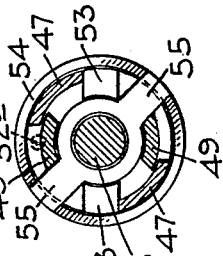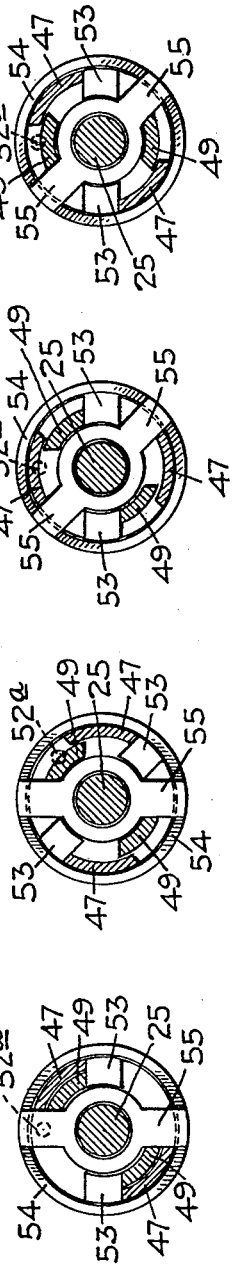

Patented Nov. 12, 1946

2,411,080

UNITED STATES PATENT OFFICE 2,411,080

RANGE SETTING MECHANISM

Charles W. Buckley, Mount Vernon, N. Y., assignor to Ford Instrument Company, Inc., Long Island City, N. Y., a corporation of New York Application June 15, 1943, Serial No. 490,860

12 Claims. (Cl. 74—395)

This invention has especial utility and will be illustrated and described as applied to range setting and indicating mechanism of gun directors, since it affords convenient means to modify range values so as to generate and indicate a future or predicted range, that is, present range corrected to provide for the change that will occur during the time of flight of the projectile.

A particular feature of the invention is a differential construction that enables the operator simply and conveniently to introduce the necessary change in the incoming present range values, which normally is motor driven, to generate the corrected range values, and will also enable him selectively to set both present and corrected range by hand.

When so used, the differential provides a direct drive between the range shaft and the corrected range shaft, but this drive connection is made yieldable so that the operator may introduce into it the desired correction. In effect the input and output gears of the differential have a resilient drive connection that is of sufficient strength to transmit the range directly and yet will permit the intermediate gear to be turned to introduce modifications in the transmitted value. The resilient connection creates a bias so that the intermediate gear will return to its original position when released.

To prevent overloading and injuring the mechanism it is desirable to introduce a relief connection in the train. For this purpose the invention contemplates a special form of yieldable coupling suitable to the space limitations of the differential construction and capable of absorbing limited relative movement at the coupling from either direction.

Specifically the special form of coupling comprises a coil spring around the shaft at one side of the joint with its opposite ends connected to members that provide abutments for lugs on the respective shaft sections, so that the spring yieldingly opposes relative movement of either shaft section.

The motor drive to the differential is through a manually operable clutch, and when the clutch is on manual setting the differential may be operated to set in the initial range by hand as well as to introduce the modification for the corrected range.

There are other advantages inherent in the construction as will appear from the following particular description of the illustrated embodiment of the invention.

Fig. 1 is a diagrammatic, perspective view of a mechanism embodying the invention.

Fig. 2 is a sectional elevation of the differential and immediately associated parts.

Fig. 3 is an enlarged, expanded, perspective view with parts broken away, of the relief coupling and adjacent parts, the cylinder member being sectioned on line 3—3 of Fig. 4.

Fig. 4 is a detail in plan of the cylinder member of the coupling.

Fig. 5 is an end view of the same.

Fig. 6 is a section on line 6—6 of Fig. 2 with the parts in normal drive relation.

Fig. 7 is a similar section showing the parts displaced in one angular direction by a relative movement of the drive section of the shaft.

Fig. 8 is a similar section showing the parts displaced in the opposite angular direction by a relative movement of the drive section of the shaft.

Fig. 9 is a similar section showing the parts displaced by a relative movement in one direction of the driven or input section of the shaft.

On automatic operation, the range setting is introduced by an electric servomotor 1 which reproduces the movement of the rotor of a receiver motor 2 of a self-synchronous transmission system under the control of a suitable transmitter. The servomotor is controlled by contacts 4 which are brought into engagement by rotation of the rotor of the receiver motor 2 relative to the stator due to the signal received from the transmitter. The stator of the receiver motor is rotatably mounted and the response of the servomotor is connected to turn the stator of the receiver motor, in the form of relay shown, through shaft 3 so as to open the electric contacts 4 and stop the servomotor when the incoming quantity represented by the movement of the rotor is reproduced by the shafts 3 and the stator of the receiver motor 2.

The ultimate indications are on a range dial 5 on a range shaft 6, and on a corrected range dial 7 on a corrected range shaft 8. The movement of the latter shaft may be transmitted by shaft 9 to other mechanism.

The shaft 10 of motor 1 includes a clutch 11 the movable element of which is controlled by a handle 12 that operates a crank 13 having a yoke or equivalent connection with the movable clutch element. A spring leaf contact member 14 which is biased to open contact position, is so located as to be pressed into engagement with its cooperative contact when the crank 13 is turned to engage the clutch, and to clear the contact member 14 and allow the contact to open when the clutch is open as shown for manual control. A pointer on the handle 12 cooperates with indexes to denote the condition of the clutch.

The section of shaft 10 beyond the clutch is operatively connected to the range shaft 6 through shaft 15 and suitable gearing. As shown, the contact 14 is in the circuit of motor 1 and therefore the motor is cut out when the mechanism is on manual control.

The movement of shaft 6 is transmitted to shaft 8 through the differential mechanism which will now be described. As shown in Fig. 1, this mechanism has an outside fixed bearing member 16 that is tubular in form and has a head 16a fastened on a permanent support 17. Bearing in this is a housing member 18 that has two angularly related tubular portions 19 and 20, the former bearing in the tubular bearing member 16 of the outside fixed bearing member. At the juncture of the two tubular portions 19 and 20 the housing has an enlarged cavity closed by a removable cap 21.

In the head or cavity of the housing are two meshing bevel gears 22 and 23, the one on the incoming shaft from the motor and the other on the shaft of a handle, as will be described. These bevel gears together with the housing constitute the three elements of the differential. As will be seen, the housing is constrained to turn with the gear 22 except as affected by the turning of the gear 23 on its axis.

The incoming shaft from the motor drive consists of alined shaft sections 24 and 25 which are coupled by the relief connection that will later be described. Shaft section 24, which may be termed the drive shaft, bears in a bearing 26 in the outer end of tubular portion 19 of the housing and has on its outer end a spur gear 27 spaced from the end of the housing by a hub 28 and meshing with spur gear 29 on shaft 6. The shaft section 25, which may be termed the input shaft, bears in a bearing 30 in the inner end of tubular portion 19 and has bevel gear 22 fixed on its inner end. In tubular portion 20 of the housing is a shaft 31 bearing in spaced bearings 32 and 33. On the inner end of shaft 32 is fixed the bevel gear 23 and on its outer end is a handle 34. The handle is partially located below the upper end of the tubular portion 20 which is cut away to provide limit stops to the angular movement of the handle.

Ball bearings 35 and 36 are provided between the fixed housing member 16 and the angularly movable tubular portion 19. A packing 37 in the one end and a suitable packing on the other end exclude moisture and dust from the bearings. A collar 38 is secured on the outer end of the tubular portion 19 immediately outside the fixed tubular member 16, and a gear sector 39 is secured on the collar 38. This gear sector meshes with spur gear 40 on shaft 8.

The yieldable connection between the bevel gear 22 and the housing consists of a coil spring 41 surrounding a sleeve 42 on the shaft 25 in the head of the housing between the gear 22 and a disk 43 fixed on the end of the shaft. One end of the spring bears against a stud 22a on the gear 22 and the other end bears against a stud 43a on the disk 43. A screw stud 44 is disposed in the housing adjacent stud 22a, and a screw stud 45 is disposed in the housing adjacent the stud 43a. These screw studs serve as limit stops to the ends of the spring.

The spring 41 is stiff enough to turn the housing directly with the gear 22 in the absence of abnormal load on the housing. If the operator turns the handle 34, the engagement of the gear 23 with the gear 22 will cause the housing to move angularly about the axis of the gear 22 and thus to impart a supplemental movement to the gear sector 39 and the parts driven thereby. This turning of the housing will move the studs 44 and 45 which will cause one of these studs to leave its spring end and the other to coil its end of the spring tighter. As soon as the operator lets go of the handle the spring end which has been removed from its inner stud 22a or 43a will spring back and move the housing stud with it until the inner stud is again engaged. Thus the spring permits a yielding to put in corrections with the handle 34, but it constantly biases the gear 22 and the housing to a definite angular relation.

The relief connection between the shaft sections 24 and 25 will now be described. It is shown in operative form in Fig. 2 but will be more easily understood by reference to Fig. 3.

On the end of shaft 24 and integral therewith in the form shown, is a cup-shaped collar member 46 having on its inner edge two extensions forming lugs 47 spaced 180° apart. The member 46 is provided with an axial bore in which the end of the shaft 25 fits. On the shaft 25 near this end is fixed a collar 48 that is of a size to fit in the member 46 and has on its inner edge two axial extensions forming lugs 49 also spaced 180° apart. In the normal position of the parts the lugs 49 nest inside the lugs 47, as appears clearly in Fig. 6.

Surrounding the shaft 25 beyond the collar 48 is a coil spring 50. Loose on the shaft at each end of the spring 50 is a cap member that forms an abutment for the corresponding end of the spring and is connected to a part that extends in the plane and therefore lies in the path of the lugs 47 and 49. Therefore if the lugs are moved angularly with respect to each other, one cap will be held against turning by the fixed lugs and the other will be turned by the movable lugs and thus store energy in the spring within the limit of movement of the lugs.

The abutment cap for the inner end of the spring is numbered 51 and the one for the outer end of the spring is numbered 52. Each cap has an annular groove in which the end of the spring is received and a pin in the groove against which the end of the spring abuts. The pins are numbered 51a and 52a, respectively. The cap 52 has two axial peripheral lugs 53 extending from its rear edge and disposed 180° apart. When the parts are condensed into the operative position shown in Fig. 2 the lugs 53 are in the plane of the collar lugs 47 and 49.

Enveloping the spring 50 and the caps is a hollow cylinder 54 which is open at its inner end and is cut out on opposite sides at its rear end until its width is brought down to a relatively narrow integral cross bar 55 having a hub portion that fits loosely upon the shaft 25. The hub is of a size to fit within the collar lugs 49 and within the cap lugs 53. Therefore when the parts are assembled in final form the cross bar 55 is in the plane of the collar lugs 47 and 49 and of the cap lugs 53, and the ends of the cross bar constitute lugs cooperative with the lugs 53. The radial line of the cross bar 55 is at 90° to that of the lugs 53, and the collar lugs are of a length to fill the space between the cap lugs when the parts are in normal position. Thus the angular spaces between the cap lugs are alternately free and occupied by the collar lugs.

The cap 51 has locking relation with the cylinder 54 so that the two are constrained to turn as a unit. As shown, the cap has diametrically opposed ears 56 and the inner edge of the cylinder has notches 57 adapted to receive the ears. The resilient force of the spring is determined by the angular disposition of the cap 51 relative to the cylinder.

It will now be understood that in the assembled, compact position of the parts, the spring 50 has its ends in the caps and the cap 52 abuts axially against the cross bar 55 with the lugs 53 straddling the hub of the cross bar, and the cross bar and lugs 53 abutting against the face of the collar 48 between the lugs 49 and spaced to allow relative angular movement of approximately 45°. The end of the shaft 25 is received in the socket of the collar 46 so that the lugs 49 nest in the lugs 47. The cap 51 fits in the inner or open end of the cylinder 54 with the ears 56 in notches 57. The bearing 30 abuts against the cap 51 on the one side and the bearing is held in the housing by a retaining washer 58 on the other side which is screwed to the housing within the head. To provide access to the screw which retains the washer 58, the gear wheel 22 has a cut-out 59 in its edge adjacent the stud 22a. The range of movement is such that the gear wheel has teeth for approximately half of its periphery, the other half being smooth, as shown.

Figures 6 to 9, inclusive, make clear the action of the relief coupling. Normally the parts have the relation shown in Fig. 6. Figs. 7 and 8 show what happens when the output of the differential is locked, as might be the case, for example, if a limit stop is engaged, and motor 1 continues to turn the shaft 24. Since the shaft 25 is held against turning, the lugs 49 stay fixed, while the lugs 47 turn. In one direction of movement of the shaft 24, the lugs 47 push against the lugs 53 and so rotate the cap 52 and its end of the spring. This is shown in Fig. 7. In the other direction of movement of the shaft 24, the lugs 47 push against the cross bar 55 and so rotate the cylinder 54 and the cap 51 and its end of the spring. This is shown in Fig. 8.

If the shaft 24 is held against turning, then the lugs 47 remain fixed and movement of the housing, as might occur, for example, by the application of force to the tubular portion 20 of the housing, will cause rotation of the lugs 49. The effect of movement of the housing in one direction is shown in Fig. 9. In this direction the cross bar and cylinder are turned. In the other direction they will remain fixed and the lugs 53 and hence the cap 52 will turn. This yielding of the relief coupling presupposes a load above that required for normal operation.

For making manual setting of the range the clutch 11 will be disengaged and the housing will be turned until the present range is indicated. The corrected range may be adjusted relative to the present range by turning handle 34. For automatic operation the clutch will be engaged and the shaft 24 will be positioned by the servomotor 1 and the handle 34 may be turned to introduce the correction for advance range. The servomotor will be energized by the closing of the contact 14 when the clutch is shifted to the automatic position and will operate under the control of contacts 4 to keep the range setting in agreement with the developing range as received by the receiver motor 2.

It is obvious that various modifications may be made in the construction shown in the drawings and above particularly described within the principle and scope of the invention.

I claim:

1. A differential mechanism comprising an input gear, an intermediate gear meshing with the input gear and an output gear operatively related to the intermediate gear, resilient means connecting two of the gears and biasing the gears in predetermined angular relation, and manual means for adjusting the intermediate gear.

2. A differential mechanism comprising an input gear, an intermediate gear meshing with the input gear and an output gear operatively related to the intermediate gear, resilient means connecting two of the gears and biasing the gears in predetermined angular relation, manual means for adjusting the intermediate gear, a driving shaft, and a relief coupling between the shaft and the input gear.

3. A differential mechanism comprising an input gear, a structure mounted for angular movement coaxially with the input gear, a second gear pivotally carried by the structure and meshing with the input gear, an output gear connected to be angularly moved with the structure, manual means for rotating the second gear, and yielding means biasing the input gear to a predetermined angular position relative to the structure.

4. A differential mechanism comprising an input gear, a structure mounted for angular movement coaxially with the input gear, a second gear pivotally carried by the structure and meshing with the input gear, an output gear connected to be angularly moved with the structure, manual means for rotating the second gear, yielding means biasing the input gear to a predetermined angular position relative to the structure, a driving shaft, and means yieldably coupling the shaft to the input gear.

5. A differential mechanism comprising an input shaft, a bevel gear fixed on the shaft, a housing rotatably bearing on the shaft, a second bevel gear bearing in the housing and meshing with the first bevel gear, an output gear actuated by the housing, manual means for angularly adjusting the second bevel gear in its bearing, and yielding means biasing the bevel gears to a predetermined relation to the housing.

6. A differential mechanism comprising an input shaft, a bevel gear fixed on the shaft, a housing rotatably bearing on the shaft, a second bevel gear bearing in the housing and meshing with the first bevel gear, an output gear actuated by the housing, manual means for angularly adjusting the second bevel gear in its bearing, yielding means biasing the bevel gears to a predetermined relation to the housing, a driving shaft, and means yieldably coupling the two shafts.

7. A differential mechanism comprising an input shaft, a bevel gear fixed on the shaft, a housing including a tubular part surrounding and bearing upon the shaft, a second bevel gear bearing in the housing and meshing with the first bevel gear, an output gear carried by the tubular member of the housing, manual means for angularly adjusting the second bevel gear in its bearing, and spring means connecting one of the bevel gears to the housing and biasing the input shaft to a predetermined angular relation to the tubular part of the housing.

8. A differential mechanism comprising an input shaft, a bevel gear fixed on the shaft, a housing including a tubular part surrounding and bearing upon the shaft, a second bevel gear bearing in the housing and meshing with the first bevel gear, an output gear carried by the tubular housing, manual means for angularly adjusting the second bevel gear in its bearing, spring means connecting one of the bevel gears to the housing and biasing the input shaft to a predetermined angular relation to the tubular part of the housing, a driving shaft, and means yieldingly coupling the two shafts.

9. A differential mechanism comprising a housing having a tubular extension, an input shaft bearing in the tubular extension, the housing being angularly movable about the shaft as an axis, a bevel gear on the input shaft, a second bevel gear meshing with the first bevel gear and bearing in the housing, manual means for angularly adjusting the second bevel gear in its bearing, an output gear carried by the tubular extension, resilient means biasing the input shaft to a predetermined angular relation to the tubular extension, a driven shaft alined with the input shaft, and a yielding spring coupling between the two shafts.

10. A differential mechanism comprising a housing having a tubular extension, an input shaft bearing in the tubular extension, the housing being angularly movable about the shaft as an axis, a bevel gear on the input shaft, a second bevel gear meshing with the first bevel gear and bearing in the housing, manual means for angularly adjusting the second bevel gear in its bearing, an output gear carried by the tubular extension, resilient means biasing the input shaft to a predetermined angular relation to the tubular extension, a driven shaft alined with the input shaft, telescoping collar members fixed on the adjacent ends of the respective shafts and provided with corresponding spaced axial lugs in a common transverse plane, a coil spring surrounding one of the shafts, and two angularly spaced radial abutment members disposed in the transverse plane of the lugs and connected to the respectively opposite ends of the spring, whereby relative angular movement of the collar members in either direction moves one abutment member toward the other against the force of the spring.

11. A differential mechanism comprising an input gear, an intermediate gear meshing with the input gear and an output gear operatively related to the intermediate gear, resilient means connecting two of the gears and biasing the gears in predetermined angular relation, manual means for adjusting the intermediate gear, and power means for positioning the input gear.

12. A differential mechanism comprising an input gear, an intermediate gear meshing with the input gear and an output gear operatively related to the intermediate gear, resilient means connecting two of the gears and biasing the gears in predetermined angular relation, manual means for adjusting the intermediate gear, a driving shaft, a relief coupling between the shaft and the input gear, and power means for positioning the driving shaft.

CHARLES W. BUCKLEY.